(12) United States Patent
Nakamura et al.

(10) Patent No.: US 10,122,867 B2
(45) Date of Patent: Nov. 6, 2018

(54) IMAGE FORMING APPARATUS AND IMAGE FORMING METHOD WITH CONTINUOUS PRINTING

(71) Applicant: CANON KABUSHIKI KAISHA, Tokyo (JP)

(72) Inventors: Sho Nakamura, Tokyo (JP); Norio Shimura, Yokohama (JP); Koji Yasuzaki, Tokorozawa (JP); Taketoshi Kusakabe, Kawasaki (JP); Kentaro Fukushima, Mitaka (JP); Masaki Tanabe, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/597,799

(22) Filed: May 17, 2017

(65) Prior Publication Data

US 2017/0346956 A1 Nov. 30, 2017

(30) Foreign Application Priority Data

May 30, 2016 (JP) .................. 2016-106899

(51) Int. Cl.
*H04N 1/00* (2006.01)
*G06F 3/12* (2006.01)
*H04N 1/04* (2006.01)

(52) U.S. Cl.
CPC ....... *H04N 1/00037* (2013.01); *G06F 3/1236* (2013.01); *G06F 3/1268* (2013.01); *G06F 3/1286* (2013.01); *H04N 1/00602* (2013.01); *H04N 1/04* (2013.01); *H04N 2201/0094* (2013.01)

(58) Field of Classification Search
CPC .. H04N 1/00037; H04N 1/00602; H04N 1/04; G06F 3/1268; G06F 3/1251; G06F 3/1262; G03G 15/652
USPC ............................................. 358/1.12, 1.13
See application file for complete search history.

(56) References Cited

U.S. PATENT DOCUMENTS 6,356,721 B1 * 3/2002 Motoyoshi ............. G03G 15/50
399/82
8,351,056 B2 1/2013 Shimura
9,183,472 B2 11/2015 Kusakabe
(Continued)

FOREIGN PATENT DOCUMENTS

JP 2012-192658 10/2012

OTHER PUBLICATIONS

U.S. Appl. No. 15/597,821, filed May 17, 2017 by Norio Shimura et al.
(Continued)

*Primary Examiner* — Jamares Q Washington
(74) *Attorney, Agent, or Firm* — Fitzpatrick, Cella, Harper & Scinto

(57) ABSTRACT

An image forming apparatus performs printing based on a print job and determines whether printing for a first print job and a second print job having been received after the first print job can be made continuously based on a progress of printing for the first print job. In a case where it is determined that the printing for the first print job and the second print job can be made continuously, print media to be used for printing for the second print job is fed to a conveyance path before completing outputting printouts for the first print job.

16 Claims, 6 Drawing Sheets

(56) References Cited

U.S. PATENT DOCUMENTS

2012/0020716 A1\*  1/2012  Hashimoto .......... B41J 13/0009
                                                      400/582
2013/0229684 A1   9/2013  Yasuzaki
2015/0085310 A1   3/2015  Yasuzaki
2015/0189103 A1   7/2015  Yasuzaki

OTHER PUBLICATIONS

U.S. Appl. No. 15/597,836, filed May 17, 2017 by Taketoshi Kusakabe et al.

\* cited by examiner

IMAGE FORMING APPARATUS AND IMAGE FORMING METHOD WITH CONTINUOUS PRINTING

BACKGROUND OF THE INVENTION

Field of the Invention

The present invention relates to an image forming apparatus which continuously prints out a plurality of print jobs and an image forming method.

Description of the Related Art

An image forming apparatus performing high-speed printing by notifying a printer engine of the number of paper feeds required for printing associated with a print job and by sequentially feeding cut sheets from a paper feed unit is well known. Such an image forming apparatus is widely used in the field of commercial printing which requires compatibility between quality and speed for the printing.

In an image forming apparatus of an inkjet type, once the printing temporarily stops, various adjustments are normally made for the next printing. For example, such adjustments include cap processing which shuts out the open air to prevent an ejection port for ejecting ink from drying, and the cleaning of the ejection port. Some of the image forming apparatuses used in the field of commercial printing cause downtime for a few minutes for such adjustments. From the viewpoint of productivity, it is desirable that the printing be prevented from stopping as much as possible.

In view of the above, a method of continuous printing which performs printing for two consecutive print jobs in succession so as not to cause stop time between the printing for a previously received print job and the printing for a subsequently received print job has been developed.

Japanese Patent Laid-Open No. 2012-192658 discloses a printer which compares the print setting of a previously received print job and the print setting of a subsequently received print job to determine that continuous printing can be made if at least their size designation of sheets to be printed is the same. The printer disclosed in Japanese Patent Laid-Open No. 2012-192658 feeds, in a case where it is determined that the continuous printing can be made, paper for the subsequently received print job before completing paper output for the previously received print job to achieve the continuous printing.

SUMMARY OF THE INVENTION

An object of the present invention is to further improve accuracy in determining whether the continuous printing can be made.

An image forming apparatus of the present invention is an image forming apparatus which performs printing based on a print job, and includes: a determination unit configured to determine whether printing for a first print job and a second print job having been received after the first print job can be made continuously based on a progress of printing for the first print job; and, in a case where it is determined that the printing for the first print job and the second print job can be made continuously, a feed unit configured to feed print media to be used for printing for the second print job to a conveyance path before completing outputting printouts for the first print job.

Further features of the present invention will become apparent from the following description of exemplary embodiments with reference to the attached drawings.

DESCRIPTION OF THE EMBODIMENTS

In the method disclosed in Japanese Patent Laid-Open No. 2012-192658, the progress of the printing for the previously received print job is not taken into account. For example, in a case where the feeding for the number of papers required for the printing for the previously received print job is completed, a printer engine once stops paper feed operation. As a result, there has been a case where, irrelevant to the determination that continuous printing can be made based on a print setting, downtime occurs in the image forming apparatus, failing to make continuous paper feeding for the subsequently received print job.

Hereinafter, an embodiment to carry out the present invention will be explained in detail with reference to the drawings. It should be noted that constituent elements described in the embodiment are mere examples, and thus, the scope of the present invention is not directed to limiting only to the relative arrangements, the shape of the apparatus, and the like for those constituent elements. Further, the "image forming apparatus" in the present specification includes not only a dedicated apparatus having only a printing function but also a multifunction machine having the printing function and other functions, a manufacturing apparatus forming images and patterns on a print medium, and the like.

[Entire Configuration of Image Forming Apparatus]

Figure 1:
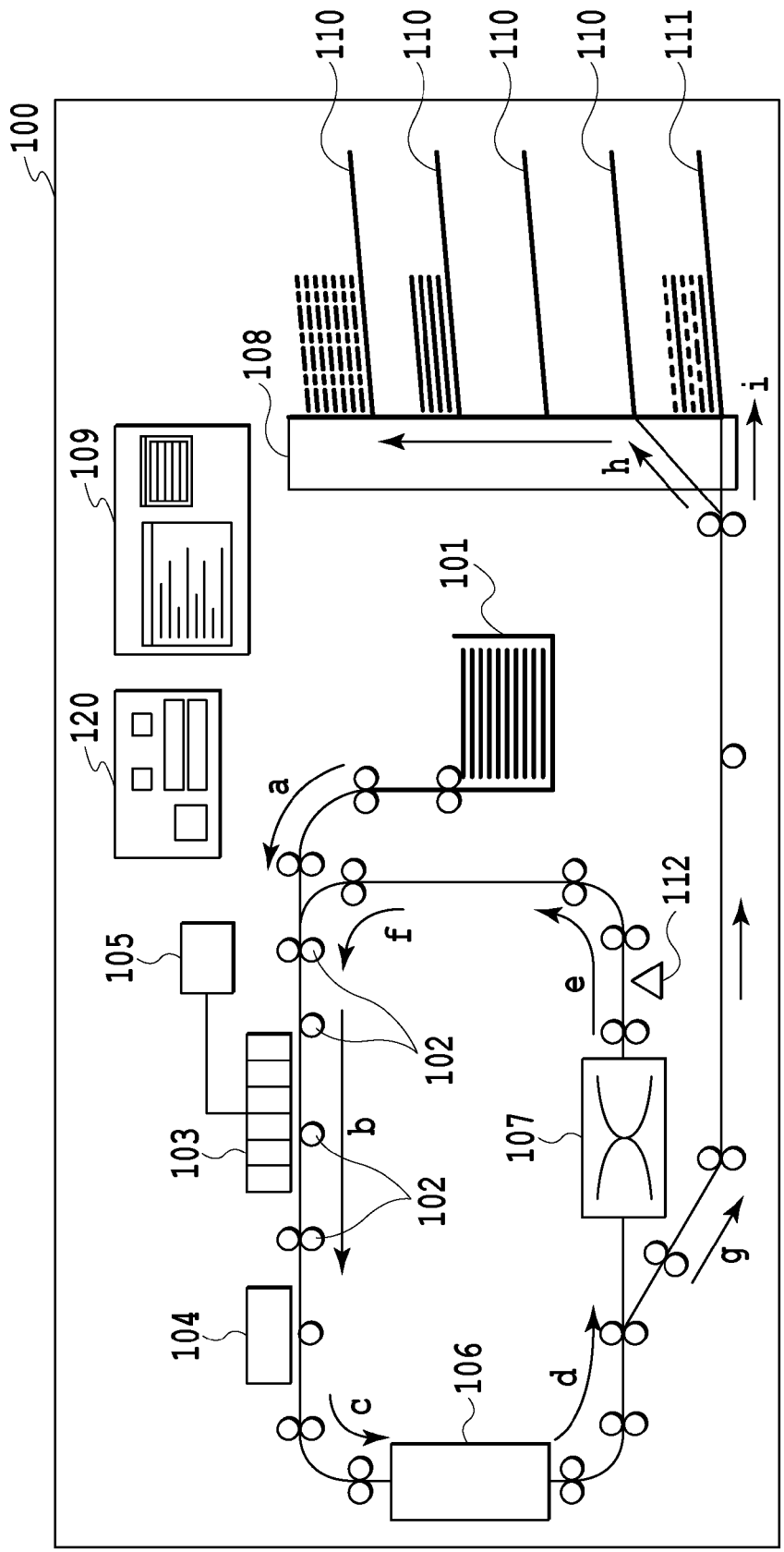
FIG. 1 is an entire configuration diagram of an image forming apparatus according to the present embodiment.

FIG. 1 is an entire configuration of an image forming apparatus 100 using a cut sheet (which is a sheet (print medium) cut in predetermined sizes such as Large-size, A4 size, and A3 size; hereinafter also simply referred to as a "sheet") in the present embodiment. The image forming apparatus 100 of the present embodiment includes a paper feed tray 101, conveyance rollers 102, a print head 103, and a scan unit 104. It should be noted that the image forming apparatus 100 of the present embodiment is adapted to cut sheets of various sheet sizes and various sheet types, but the cut sheet to be placed on the paper feed tray 101 is any one of those kinds. In addition, the image forming apparatus 100 includes an ink tank 105, a drying unit 106, a sheet reversing unit 107, a sorting unit 108, and an operation unit 109, and these are arranged within a housing of the image forming apparatus 100. A control unit 120 includes a controller and various I/O interfaces, and makes various kinds of control for the image forming apparatus 100.

A sheet drawn out from the paper feed tray 101 is conveyed in the direction of an arrow a as shown in FIG. 1. The sheet then proceeds in the direction of an arrow b by the conveyance rollers 102. Here, the conveyance rollers 102 are arranged over an entire conveyance path including areas not shown in FIG. 1, and convey the sheet to a predetermined place by a motor control. The sheet fed by the paper feed tray 101 moves the conveyance path and passes below the print head 103. In the print head 103, independent inkjet heads for the number of a plurality of colors (six colors in the present embodiment) are arranged along a sheet conveyance direction. Each of the inkjet heads of the print head 103 forms an image on the sheet in synchronization with sheet conveyance. The ink tank 105 stores each color of ink independently, and a tube for supplying ink communicates with the print head 103. Each color of ink is supplied to the inkjet head corresponding to each color from the ink tank 105 via the tube. The print head 103 of the present embodiment has line heads for the number of colors (six colors in the present embodiment) arranged along the direction of the arrow b, which is the conveyance direction upon printing. Each color of line head is provided with a nozzle chip. The nozzle chip provided on each color of the line head may be in a form in which a seamless single nozzle chip is provided or may be in a form in which a plurality of nozzle chips are arranged in a line or regularly arranged in a staggered manner. The line head of the present embodiment is a line head of a so-called full-multi head type in which nozzles that eject ink is provided within a range covering the maximum width of an available sheet size. As a method of ejecting ink from the nozzle, various inkjet systems such as a heat generating element system, a piezoelectric element system, an electrostatic element system, and an MEMS element system can be applied. As described above, the present embodiment exemplifies the printer of an inkjet system, but is not limited to the printer of the inkjet system. For example, various systems of printers such as a thermal printer (e.g., a sublimation type and a thermal transfer type), a dot impact printer, an LED printer, and a laser printer can also be applied.

A sheet on which an image is formed is conveyed to the scan unit 104 by the conveyance rollers 102. In the scan unit 104, the image formed on the sheet or a specific pattern formed on the sheet is read and these outputs are confirmed to check the states of each color of the line heads and the nozzle chip(s). In addition, the scan unit 104 can also read the back face of the sheet as well as the front face of the sheet to be printed, and can detect displacement and the like of a printing position between the front face and back face of the sheet through a specific pattern formed on the front face and back face of the sheet. The sheet conveyed from the scan unit 104 is conveyed in the direction of an arrow c, and passes through the drying unit 106. In order to dry the sheet to which ink is applied in a short time, the drying unit 106 heats the sheet that passes through the unit with warm air. The sheet that passed through the drying unit 106 then moves in the direction of an arrow d and is conveyed to the sheet reversing unit 107. The sheet reversing unit 107 conveys the sheet in a manner of reversing the front and back faces of the sheet that passes through the unit. As a method of reversing the sheet to be conveyed, a switch-back system and a system of twisting the conveyance path with a gentle curve are well known, and both of these systems may be applicable. The sheet reversing unit 107 of the present embodiment reverses the sheet by using the system of twisting the conveyance path with a gentle curve. This is because that, while the switch-back system needs to temporarily stop the sheet during its conveyance, the system of twisting the conveyance path can keep the speed of sheet conveyance constant without stopping the sheet conveyance.

The sheet is in a state where the front face and the back face are reversed at the time of passing through the sheet reversing unit 107, and then the sheet moves out of the sheet reversing unit 107 and moves in the direction of an arrow e. The reversed sheet further moves in the direction of an arrow f, and returns to the conveyance path where the print head 103 is located. As such, a path in the order of b, c, d, e, f, and b shown in FIG. 1 is configured as a circulation path, and the front face and the back face of the sheet are controlled to be switched upside down per lap. In the present embodiment, the number of sheets which exist simultaneously on this circulation path (on the sheet conveyance path) is called "the number of sheets in circulation." The number of sheets in circulation varies depending on the sizes of the sheets. For example, in a case where the number of sheets in circulation for A3-size sheets is three, it indicates that three A3-size sheets at maximum can be simultaneously conveyed on the circulation path in the order of b, c, d, e, f, and b. On the other hand, the sheet in which printing is completed does not pass through the sheet reversing unit 107, but moves in the direction of an arrow g and is conveyed toward the sorting unit 108. In other words, a sheet for simplex printing diverges in the direction of the arrow g in the middle of a first lap and a sheet for duplex printing diverges in the direction of the arrow g in the middle of a second lap. The sheet which diverged in the direction of the arrow g and passed through the sorting unit 108 is checked by a sensor and placed on a preset tray by each image formed on the sheet. The sorting unit 108 of the present embodiment includes a plurality of trays (five trays in the present embodiment), and places the sheets by classifying them into each of the trays by each print job or by each copy. Among the plurality of trays provided at the sorting unit 108, a sheet that has favorably completed printing is placed on an output tray 110, and a sheet used for maintenance and the like is placed on a disposal tray 111. The sheet that moves in the direction of an arrow h is conveyed to the output tray 110 by the sorting unit 108 and the sheet that moves in the direction of an arrow i is conveyed to the disposal tray 111 by the sorting unit 108.

The operation unit 109 includes an input device such as a touch panel, and accepts instructions inputted through user's operation. The operation unit 109 is mainly used for accepting input to the image forming apparatus 100, but also functions as a display unit presenting to the user the state of the image forming apparatus 100 such as indications of a tray to output a sheet, now-printing, the end of printing, or error occurrence. The operation unit 109 also indicates, for example, the amount of ink residue, the amount of remaining sheets, and instructions illustrating a head cleaning method.

A sheet sensor 112 determines whether the sheet conveyed through the circulation path has arrived. In a case where the sheet conveyed through the circulation path has arrived at the position of the sheet sensor 112, the sheet detected by the sheet sensor 112 circulates in the direction of the arrow f again, and thus, the feeding from the paper feed tray 101 is inhibited. It should be noted that a plurality of sheet sensors 112 may also be located at other locations besides the position shown in FIG. 1. The position of the sensor used for determination may vary depending on the sizes of sheets or the speed of sheet conveyance.

Figure 2:
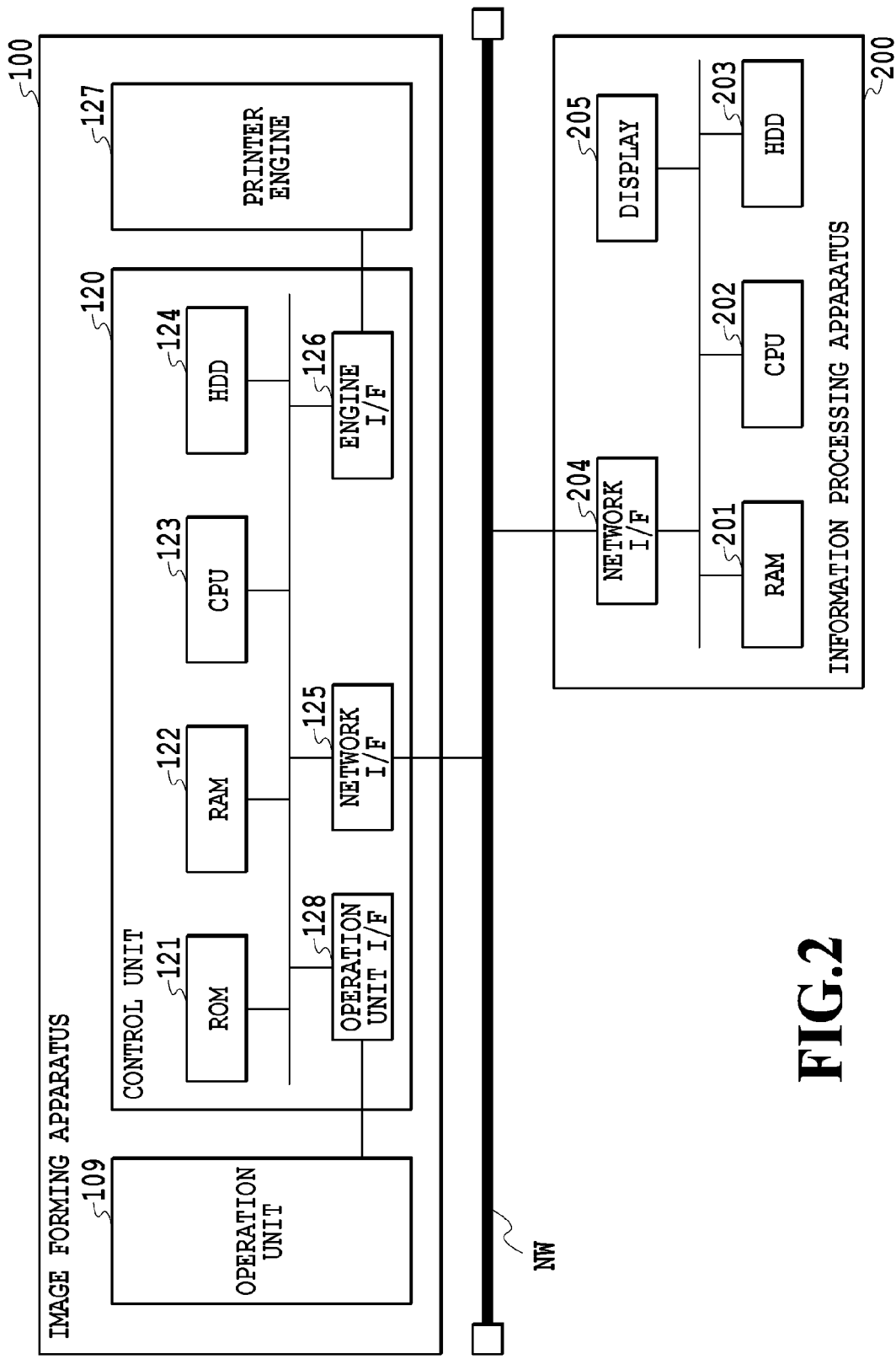
FIG. 2 is a block diagram showing hardware functional configuration of the image forming apparatus according to the present embodiment.

FIG. 2 is a block diagram showing hardware configuration of the image forming apparatus 100 and an information processing apparatus 200 according to the present embodiment. The image forming apparatus 100 of the present embodiment includes a control unit 120 which makes various control in the image forming apparatus 100 and a printer engine. The control unit 120 further includes a ROM 121, a RAM 122, a CPU 123, an HDD 124, a network I/F 125 (the "I/F" refers to an interface), an engine I/F 126, and an operation unit I/F 128. The printer engine is connected with the control unit 120 via engine I/F 126 and the operation unit 109 is connected with the control unit 120 via the operation unit I/F 128. It should be noted that, as will be described later, the image forming apparatus 100 and the information processing apparatus 200 are also connected via a dedicated line for print data, besides the network I/F.

The ROM 121 is a nonvolatile memory and stores a program for each function block of the image forming apparatus 100. The RAM 122 is a volatile memory and loads the program for each function block stored in the ROM 121 upon inserting power. Further, the RAM 122 is a primary storage area that stores information to be read out and written by each function block in high speed. The CPU 123 is an arithmetic processor which executes the program for each function block loaded on the RAM 122. The HDD 124 is a storage device capable of storing a large volume of information, and is a secondary storage area that stores image data and the like transmitted from the information processing apparatus 200. The network I/F 125 communicates with the information processing apparatus 200 via a network NW. The engine I/F 126 outputs to the printer engine 127 image data of a format dependent on the printer engine 127. The printer engine 127 drives each of the units shown in FIG. 1 to execute printing on a sheet based on the image data, and drives a paper feed mechanism such as the conveyance rollers 102 to feed the sheet to the conveyance path from the paper feed tray 101. The operation unit I/F 128 communicates with the operation unit 109. The operation unit 109 accepts instructions inputted through user's operation, as described above, and also functions as the display unit provided to the user regarding the state of the image forming apparatus 100 such as indications of a tray to output a sheet, now-printing, the end of printing, or error occurrence.

The information processing apparatus 200 includes a RAM 201, a CPU 202, an HDD 203, a network I/F 204, and a display 205. The RAM 201 is a volatile memory and loads a program for each function block stored in the HDD 203 upon inserting power. Further, the RAM 201 is a primary storage area that stores information to be read and written by each function block in high speed. The CPU 202 is an arithmetic processor which executes the program for each function block loaded on the RAM 201. The HDD 203 is a storage device capable of storing large volume of information, and is a secondary storage area that stores the program and application data for each function block. The network I/F 204 communicates with the image forming apparatus 100 and other information processing apparatuses (not shown) via the network NW. The display 205 displays a screen at the time of inserting power or activating an application, and simultaneously displays an image to cause the image forming apparatus 100 to execute printing.

The information processing apparatus 200 of the present embodiment issues print data and print setting information to the image forming apparatus 100. Furthermore, the information processing apparatus 200 generates image data to be printed. The image data for printing includes, for example, typical bitmap data. The information processing apparatus 200 receives PDL data inserted by another information processing terminal (not shown), and generates intermediate data and the bitmap data by interpreting PDL rendering instruction. To be more specific, the information processing apparatus 200 of the present embodiment plays a role of executing raster image processing (RIP) in the printing system shown in FIG. 2.

[Software Functional Configuration of Image Forming Apparatus]

Figure 3:
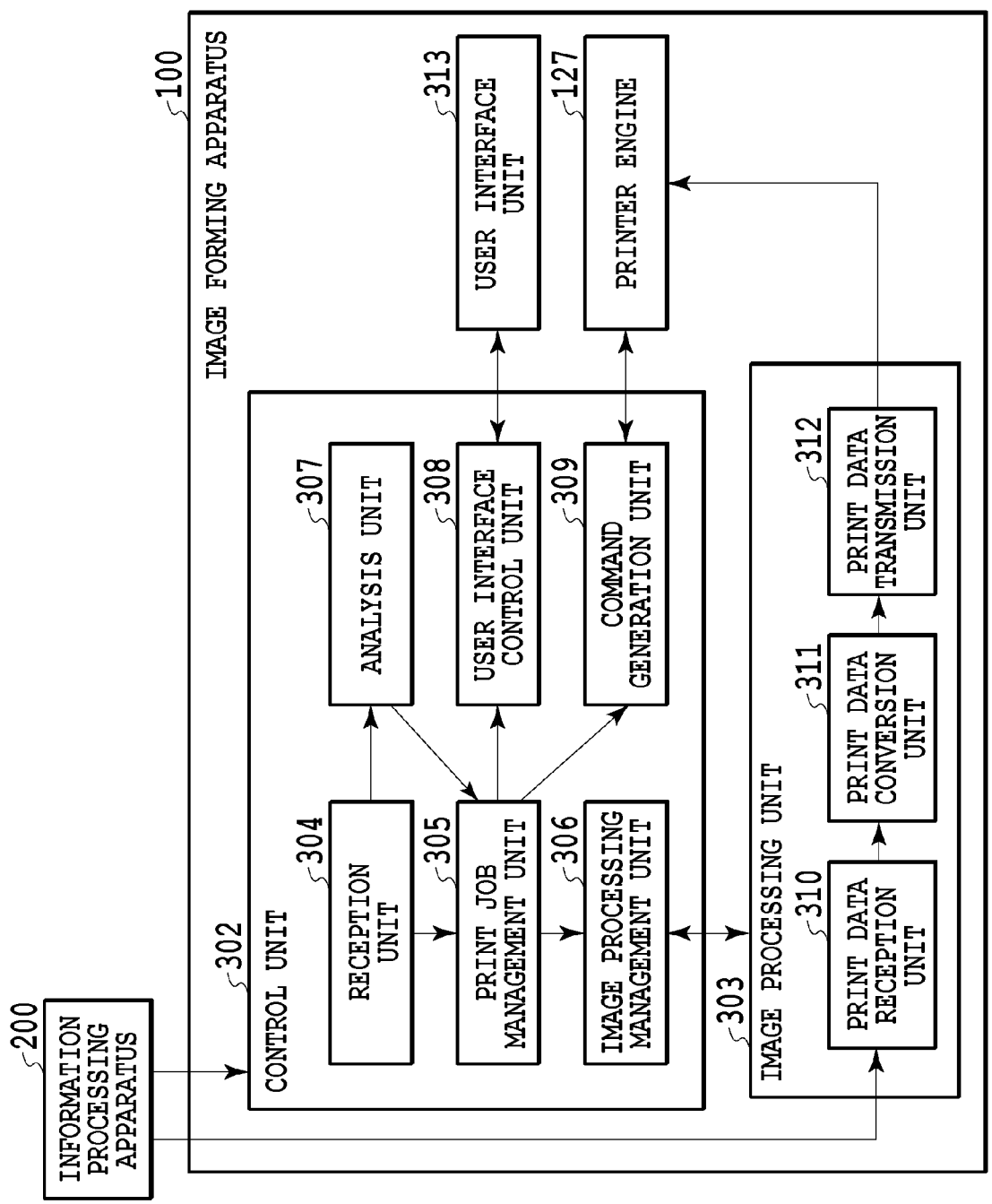
FIG. 3 is a block diagram showing software functional configuration of the image forming apparatus according to the present embodiment.

FIG. 3 is a block diagram showing functional configuration of the image forming apparatus 100 according to the present embodiment. The image forming apparatus 100 forms (prints) an image on a sheet based on print data and print setting information transmitted from the information processing apparatus 200. The information processing apparatus 200 is a high-spec personal computer or a server which mounts software for executing control processing for a print job, and is typically called a digital front end. The information processing apparatus 200 receives print data and print setting information transmitted via a user's PC (not shown), and transmits the print setting information, first of all, to a control unit 302.

The control unit 302 generates the print setting information transmitted by the information processing apparatus 200, and data and commands for executing printing based on instructions inputted by the user through a user interface unit 313. The details of the control unit 302 and an image processing unit 303 will be described later. Further, the information processing apparatus 200 and the control unit 302 are connected to each other via the network I/F. In a case of analyzing the print setting information and determining that print data can be transmitted, the control unit 302 instructs the transmission of the print data to the information processing apparatus 200. The information processing apparatus transmits, upon receiving this instruction, the print data to the image processing unit 303.

The user interface unit 313 accepts an instruction from the user and provides the user with information by displaying it on a screen or by generating a sound. Here, information provided to the user includes the state of the image forming apparatus 100 and the state of printing.

The printer engine 127 forms an image on a sheet based on the print data transmitted by the image processing unit 303 and a control command transmitted by a command generating unit 309.

The control unit 302 will be explained below in detail. The control unit 302 includes a reception unit 304, a print job management unit 305, an image processing management unit 306, an analysis unit 307, a user interface control unit 308, and a command generating unit 309. The reception unit 304 receives the print setting information from the information processing apparatus 200 and stores it.

The print job management unit 305 instructs the command generating unit 309 to generate a control command per page based on the print setting information and to transmit the control command to the printer engine 127 in a predetermined order.

The analysis unit 307 analyzes the print setting information and notifies the print job management unit 305 of the analyzed content. This information includes the content of processing to be executed by the image processing unit 303 per page.

The image processing management unit 306 follows the instruction given by the print job management unit 305 and notifies the image processing unit 303 of various instructions. To be more specific, this includes processing in which a print data reception unit 310 receives print data from the information processing apparatus 200, processing in which a print data conversion unit 311 makes conversion with respect to the received print data, and processing in which a print data transmission unit 312 transmits the converted print data to the printer engine 127.

The command generating unit 309 generates the control command which can be interpreted by the printer engine 127 based on the print setting information, and transmits the generated control command to the printer engine 127.

The image processing unit 303 will be explained below in detail. The image processing unit 303 includes the print data reception unit 310, the print data conversion unit 311, and the print data transmission unit 312, and converts print data (i.e., bitmap data) received from the information processing apparatus 200 to data dependent on the image forming apparatus 100. The print data received from the information processing apparatus 200 by the image processing unit 303 is written in the print data reception unit 310. This print data is converted into the data dependent on the image forming apparatus 100 by the print data conversion unit 311, and is written in the print data transmission unit 312. Then, the print data transmission unit 312 transmits the print data converted by the print data conversion unit 311 to the printer engine 127. The information processing apparatus 200 and the image processing unit are connected to each other via a dedicated data line. It should be noted that the print data transmission unit 312 may retain print data converted by the print data conversion unit 311, and the printer engine 127 may acquire the print data from the print data conversion unit 311.

The printer engine 127 executes printing processing based on the control command transmitted by the command generating unit 309 and the print data transmitted by the print data transmission unit 312.

Incidentally, the control unit 302 and the image processing unit 303 may be executed by different CPUs. In other words, the image forming apparatus 100 may have at least two CPUs, that is, one CPU controls the control unit 302 and the other CPU controls the image processing unit 303. In performing later-described flowcharts in the above case, processing by the control unit 302 is executed by a CPU that corresponds to the control unit 302, while processing by the image processing unit 303 is executed by another CPU that corresponds to the image processing unit 303.

Figure 4:
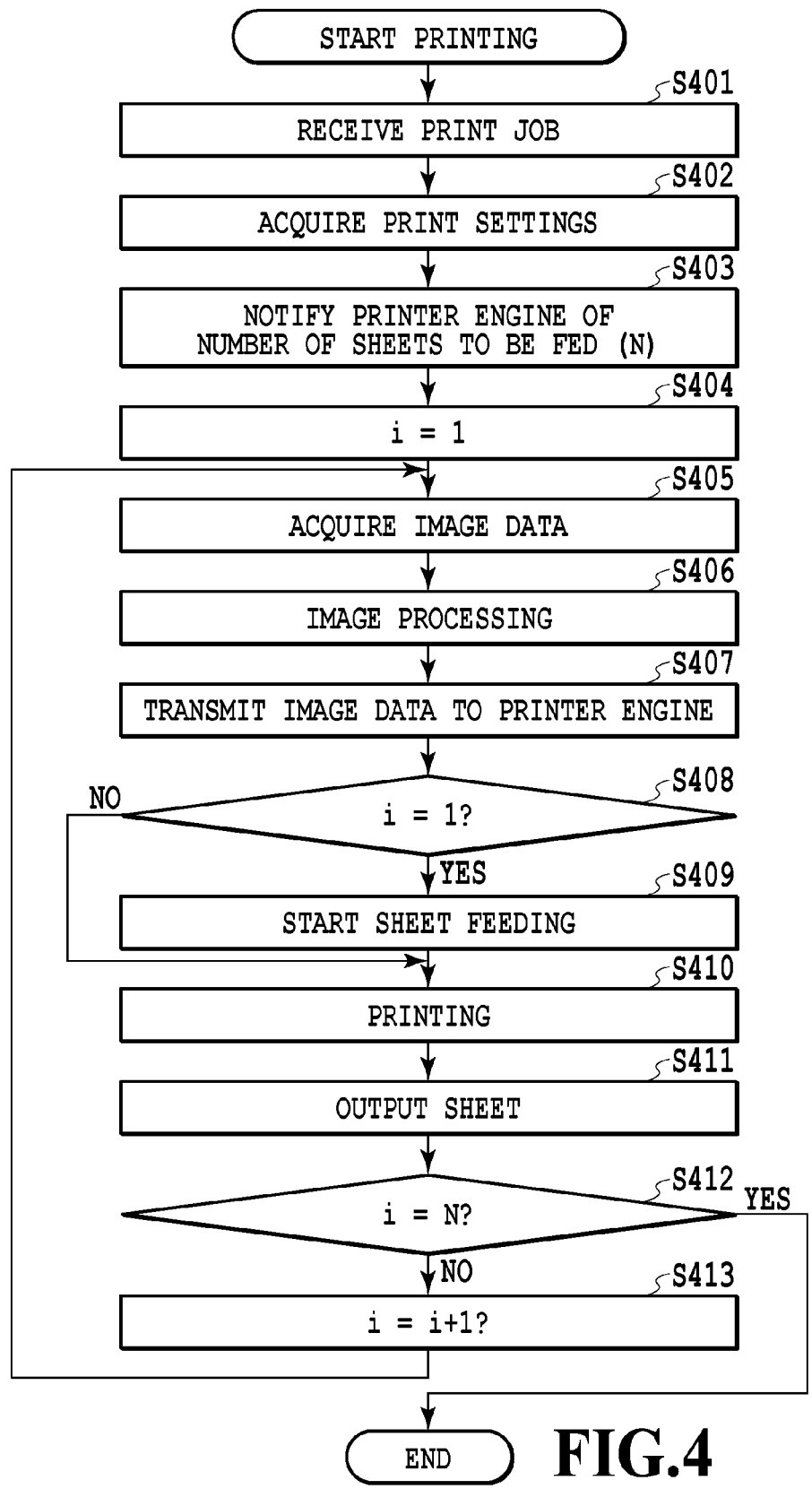
FIG. 4 is a flowchart showing steps of printing processing according to the present embodiment.

FIG. 4 is a flowchart showing steps of printing processing according to the present embodiment. The processing in the flowchart shown in FIG. 4 is executed by the CPU 123 using the loaded program codes stored in a storage area such as the ROM 121. The same applies to flowcharts shown in FIGS. 5 and 6 as described below. It should be noted that a symbol S hereinafter refers to a step in the flowcharts.

In S401, the control unit 302 receives a print job transmitted from the information processing apparatus 200. Here, the print job received in S401 does not include print data. In S402, the control unit 302 acquires, from the received print job, printing settings indicating sheet sizes (e.g., A2 size and A3 size), sheet types (e.g., normal paper and glossy paper), sheet sides to be printed (e.g., simplex printing and duplex printing), printing resolution, the number of colors to be printed, the number of sheets to be printed, the number of copies to be printed, and the like. In S403, the control unit 302 notifies the printer engine 127 of the number of sheets to be fed (N) required for printing the print job based on the number of sheets to be printed (N) which has been acquired in S402. It should be noted that, in the stage of S403, the number of sheets to be fed (N) is only notified to the printer engine 127, and the sheet feeding to the conveyance path from the paper feed tray 101 does not start at that moment.

In S404, the control unit 302 initializes a variable i. According to the present embodiment, the i represents the number of page(s) to be processed, and the processing from S405 to S411, excluding the start of feeding sheets in S409, is repeated for the number of sheets to be printed (N). In S405, the image processing unit 303 acquires image data. In S406, the image processing unit 303 generates image data of a format dependent on the printer engine 127 from the image data acquired in S405. In S407, the image data in which image processing has been made in S406 is transmitted to the printer engine 127.

In S408, the control unit 302 determines whether i=1. In other words, it is determined whether the processing is for a first page. If the processing is determined to be for the first page (YES in S408), the process proceeds to S409, and the control unit 302 instructs the printer engine 127 to feed the number of sheets to be printed (N) associated with the print job. The printer engine 127 sequentially feeds sheets for the number of sheets to be fed (N) in accordance with an instruction to feed sheets to the conveyance path from the paper feed tray 101. If the processing is determined not to be for the first page (NO in S408), the processing of S409 is skipped.

In S410, printing is made on the sheets fed to the conveyance path based on the image data received in S407. In S411, the printed sheets are outputted to the output tray 110. In S412, the control unit 302 determines whether i=N. In other words, it is determined whether processing has been made for all pages for the number of sheets to be printed associated with the print job. If the processing has not been made for all pages (NO in S412), the process proceeds to S413, and the control unit 302 makes calculation of adding one page, as i=i+1, and then returns to S405. If the processing has been made for all pages (YES in S412), the processing of this flowchart ends. As such, the image forming apparatus 100 of the present embodiment repeats a series of processing from S405 to S411 for the number of pages and completes the printing associated with the print job.

Figure 5:
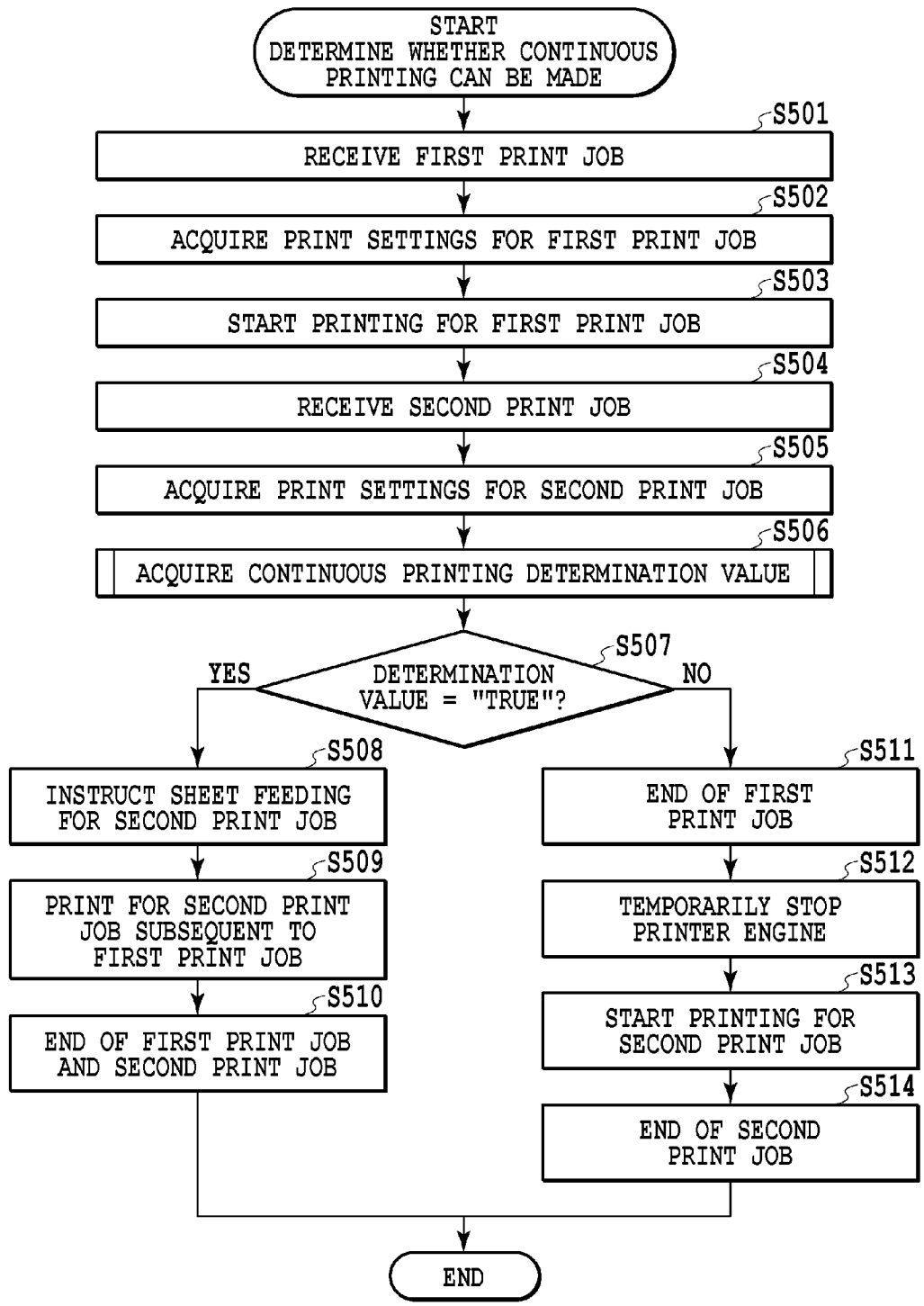
FIG. 5 is a flowchart showing steps of processing for determining whether continuous printing can be made according to the present embodiment.

FIG. 5 is a flowchart showing steps of determination processing for determining whether or not continuous printing can be made according to the present embodiment. The processing for determining whether or not the continuous printing between the printing for a previously received print job and the printing for a subsequently received print job can be made by the control unit 302 will be explained below in detail. According to the present embodiment, the continuous printing indicates an action of continuous printing on a plurality of print media without stopping the feeding and conveyance of the print media. In other words, the continuous printing indicates an action of printing to feed to the conveyance path a print medium to be printed subsequent to a preceding print medium before completing the output of the preceding print medium. It should be noted that, in a case where the continuous printing is made by a job unit, sheets to be printed based on a job to be processed subsequent to a preceding job are fed to the conveyance path before all sheets based on the preceding job are outputted.

In S501, the control unit 302 receives a first print job. It should be noted that the print job received in S501 and in later-described S504 does not include print data. In S502, the control unit 302 acquires printing settings from the first print job. In S503, the printing for the first print job starts. More specifically, the command generating unit 309 transmits the control command to the printer engine 127 and the print data transmission unit 312 transmits the print data to the printer engine, and consequently, the printing of the first print job starts.

In S504, the control unit 302 receives a second print job. According to the present embodiment, the second print job is a print job received by the reception unit 304 subsequent to the first print job in time series. In S505, the control unit 302 acquires printing settings from the second print job.

In S506, the control unit 302 acquires a determination value indicating whether or not the continuous printing for the first print job and the second print job can be made based on the printing settings acquired in S502 and the printing settings acquired in S505.

Figure 6:
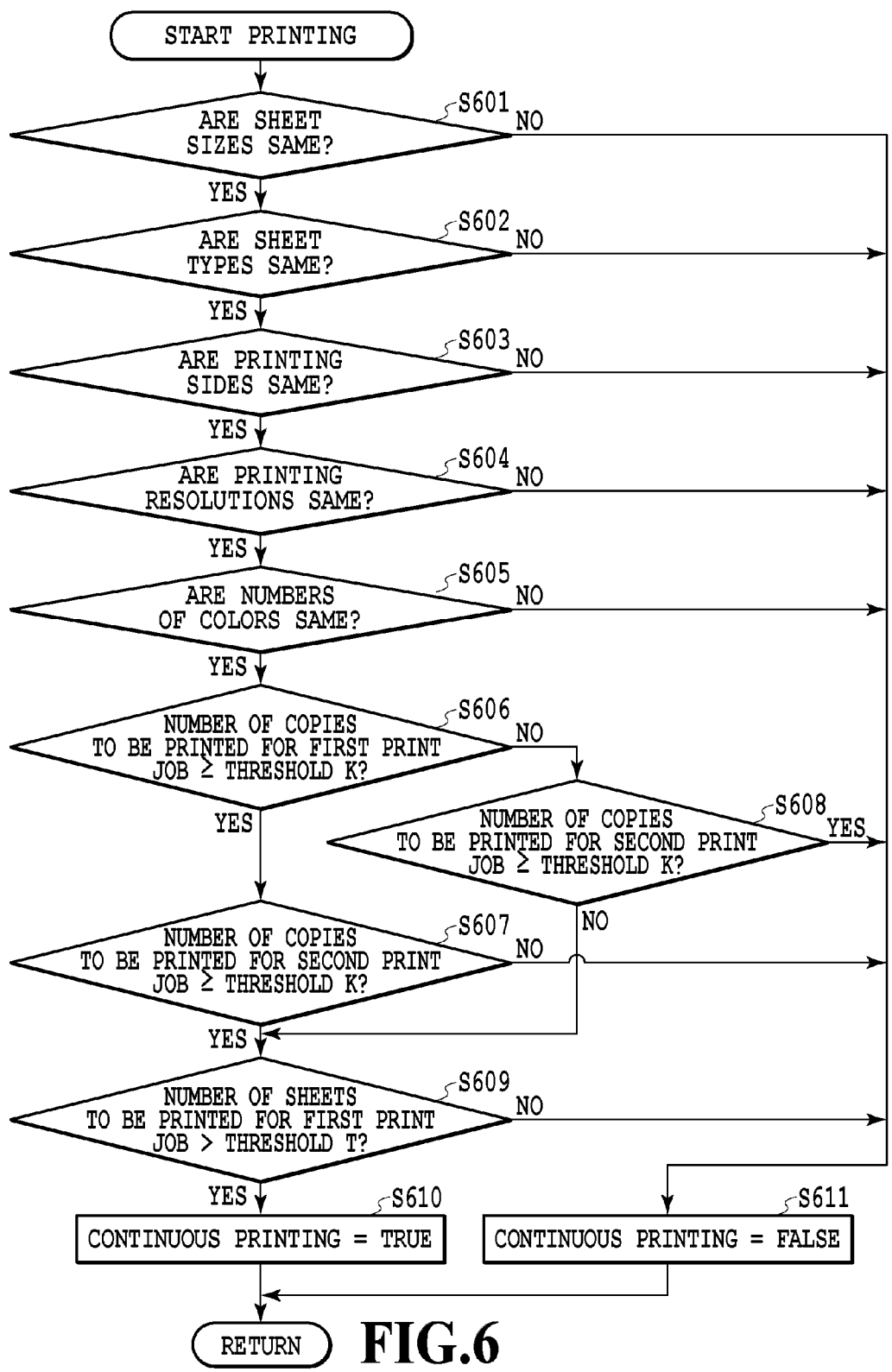
FIG. 6 is a flowchart showing steps of processing for acquiring a continuous printing determination value according to the present embodiment.

FIG. 6 is a flowchart showing steps of the processing of S506 shown in the flowchart (FIG. 5) of the determination of whether continuous printing can be made. With reference to the flowchart shown in FIG. 6, the steps of processing for acquiring a continuous printing determination value indicating whether or not the continuous printing based on the first print job and the second print job can be made will be explained below. Here, the processing shown in FIG. 6 is executed by the CPU 123 using the control unit 302.

In S601, the control unit 302 determines whether a sheet size designated in the printing setting for the first print job is identical to a sheet size designated in the printing setting for the second print job. If their sheet sizes are the same, the process proceeds to S602, and if their sheet sizes are different, the process proceeds to S611.

In S602, the control unit 302 determines whether a sheet type designated in the printing setting for the first print job is identical to a sheet type designated in the printing setting for the second print job. If their sheet types are the same, the process proceeds to S603, and if their sheet types are different, the process proceeds to S611.

In S603, the control unit 302 determines whether a sheet side(s) to be printed (e.g., simplex printing and duplex printing) designated in the printing setting for the first print job is identical to a sheet side(s) to be printed designated in the printing setting for the second print job. If their sheet side(s) to be printed are the same, the process proceeds to S604, and if their sheet side(s) to be printed are different, the process proceeds to S611.

In S604, the control unit 302 determines whether a printing resolution designated in the printing setting for the first print job is identical to a printing resolution designated in the printing setting for the second print job. According to the present embodiment, the printing resolution is designated to, for example, 300 dpi, 600 dpi, and 1200 dpi. If their printing resolutions are the same, the process proceeds to S605, and if their printing resolutions are different, the process proceeds to S611.

In S605, the control unit 302 determines whether the number of colors designated in the printing setting for the first print job is identical to the number of colors designated in the printing setting for the second print job. According to the present embodiment, the number of colors are, for example, designated to four colors of C, M, Y, and K and seven colors of C, M, Y, K, LC, LM, and G. If their numbers of colors are the same, the process proceeds to S606, and if their numbers of colors are different, the process proceeds to S611.

In S606, the control unit 302 determines whether the number of copies to be printed designated in the printing setting for the first print job is equal to or more than a threshold K. The image forming apparatus 100 of the present embodiment conveys sheets in two different speeds, that is, a speed in the case where the number of copies to be printed is equal to or more than the threshold K and the other speed in the case where the number of copies to be printed is less than threshold K. The image forming apparatus 100 of the present embodiment sets, as an example, a speed for conveying sheets to a first conveyance speed in a case where the number of copies to be printed is from one to three, and sets a speed for conveying sheets to a second conveyance speed which is faster than the first conveyance speed in a case where the number of copies to be printed is four or more. To achieve this, the threshold K is set to "four."

Here, the reason why the image forming apparatus 100 of the present embodiment changes the speed for conveying sheets in accordance with the number of copies to be printed will be described below. In comparing image data set to the resolution of 1200 dpi with image data set to the resolution of 600 dpi, their data sizes differ by four times. In order to achieve the printing of the image data set to 1200 dpi and the printing of the image data set to 600 dpi at the same speed, the image processing unit 303 must make image processing of the image data of 1200 dpi resolution four times faster than that of 600 dpi resolution.

For example, let us consider a case where one B2-size sheet is to be printed in one second. Assuming an image processing unit that completes image processing associated with image data of 600 dpi resolution within one second as a standard, four image processing units will be theoretically required to achieve image processing associated with image data of 1200 dpi resolution within one second. However, the more the number of image processing units increase, the higher the cost of the image forming apparatus 100 becomes, and thus, merely increasing the number of image processing units is not appropriate.

In a case of printing a plurality of copies, one image processing per page is executed by the image processing unit 303. Then, an image processing result by the image processing unit 303 is stored in the predetermined storage area, and the image processing result is invoked to print the plurality of copies. According to such a manner, in a case where 100 copies of a 10-page printout is to be outputted based on one job, for example, the image processing unit 303 executes image processing ten times, as one image processing is required for each page. Then, the image processing result is invoked while executing 100 copies of printing. Such a configuration can reduce the number of image processing to be executed by the image processing unit 303 and can assure the throughput of printing processing.

In the image forming apparatus 100 according to the present embodiment as well, one image processing is executed per page instead of per copy in a case of printing the plurality of copies. Here, assuming an image processing unit that completes image processing for image data of 600 dpi resolution (B2 size) within one second as a standard, four seconds will be theoretically required to achieve image processing for image data of 1200 dpi resolution (B2 size).

Here, in a case where one page is outputted per second and the number of copies to be printed is four or more, the time required for a certain page is at least four seconds. Accordingly, during the period of four seconds in which printing for four copies on the certain page is achieved, the image processing for the image data of 1200 dpi resolution (B2 size) can be achieved by the image processing unit 303.

Meanwhile, in a case where the number of copies to be printed is three or less (i.e., less than four) and one page is outputted per second, the printing time required for a certain page is three seconds or less. Accordingly, during the period of three seconds in which printing on the certain page is achieved, the image processing for the image data of 1200 dpi resolution (B2 size) cannot be achieved by the image processing unit 303.

In a case where the image processing time required for the pages to be printed is longer than the time for printing a certain page, the image forming apparatus 100 of the present embodiment adjusts the printing time and the image processing time by delaying the speed of conveying sheets. To be more specific, the image forming apparatus 100 of the present embodiment sets, in a case where the number of copies to be printed is from one to three, the speed of conveying sheets to the first conveyance speed, and sets, in a case where the number of copies to be printed is four or more, the speed of conveying sheets to the second conveyance speed which is faster than the first conveyance speed.

Furthermore, in a case where a plurality of sheets (including a sheet not having been printed and a sheet having been printed) remain in the conveyance path, the image forming apparatus 100 of the present embodiment cannot change the conveyance speed. In a case of changing the conveyance speed, the control unit 120 temporarily stops the printer engine 127 to change the setting of the conveyance speed. Accordingly, in order to achieve the continuous printing for a plurality of print jobs, the number of copies to be printed for the first print job and the number of copies to be printed for the second print job must be either from one to three or four or more, simultaneously. For example, if the first print job indicates four copies while the second print job indicates three copies, the conveyance speed of the first print job differs from the conveyance speed of the second print job. As such, sheets associated with two print jobs having different conveyance speeds cannot be conveyed in the same conveyance path. Accordingly, in order to achieve the continuous printing, the first print job and the second print job are required to be processed at the same conveyance speed. For this reason, the processing in S606 and S607 is executed. It should be noted that the above number of copies to be printed is only an example, and other number of copies to be printed may be set as a threshold K depending on the performance of the printer engine 127.

If the number of copies to be printed for the first print job is equal to or more than the threshold K, the process proceeds to S607, and if the number of copies to be printed for the first print job is less than the threshold K, the process proceeds to S608.

In S607, the control unit 302 determines whether the number of copies to be printed for the second print job is equal to or more than the threshold K. In S607, if the number of copies to be printed for the second print job is determined to be equal to or more than the threshold K, the first print job and the second print job are to be processed at the same conveyance speed. Accordingly, the processing proceeds to S609. Meanwhile, if the number of copies to be printed for the second print job is determined to be less than the threshold K, the first print job and the second print job are to be processed at different conveyance speeds, and thus, it is determined in S611 that continuous printing cannot be achieved.

In S608, the control unit 302 determines whether the number of copies to be printed for the second print job is equal to or more than the threshold K. In S608, if the number of copies to be printed for the second print job is determined to be equal to or more than the threshold K, the first print job and the second print job are to be processed at different conveyance speeds. Thus, it is determined in S611 that continuous printing cannot be achieved. Meanwhile, in S608, if the number of copies to be printed for the second print job is determined to be less than the threshold K, the first print job and the second print job are to be processed at the same conveyance speed. Accordingly, the processing proceeds to S609.

Incidentally, control of the conveyance speed depending on the number of copies is executed at the setting of 1200 dpi, but the control of the conveyance speed may not be executed in a case where the setting is 600 dpi or less. In such a case, the processing of S606 through S608 may be omitted in a case where the resolution is determined to be 600 dpi or less in S604.

In S609, the control unit 302 determines whether the number of remaining sheets to be printed for the first print job is more than a threshold T. As explained in the flowchart of FIG. 4, the printer engine 127 receives the sheet feeding instruction, and then sequentially feeds sheets for the instructed number of sheets to be fed (N) to the conveyance path from the paper feed tray 101 (S409). In the present embodiment, the number of remaining sheets to be printed is obtained by: the number of remaining sheets to be printed=the number of sheets to be printed (N)−the number of pages already printed (i). In the present embodiment, as a threshold T, out of the number of remaining sheets to be printed for the first print job, a number equal to the number of sheets that have been already fed from the paper feed tray 101 is set. For example, assuming that 100 sheets are required for printing associated with the first print job and 50 sheets have already been printed, and that, out of the remaining 50 sheets, 15 sheets have already been fed to the conveyance path from the paper feed tray 101, the threshold T is 15. In this case, since the number of remaining sheets in the paper feed tray 101 for processing the first print job is 35, the processing of S609 is determined to be YES. It should be noted that the threshold T may also be set in other methods. For example, the number of remaining sheets required for the continuous printing may be calculated beforehand and the resultant may be set as a threshold T.

In a case where the number of remaining sheets to be printed for the first print job is greater than the threshold T, the printer engine 127 needs to feed sheets that are not fed to the conveyance path yet from the paper feed tray 101 for processing of the first print job. In other words, the paper feed mechanism is in a state of operation, and at this timing, an additional sheet feeding instruction is given so as to cause the printer engine 127 to make the sheet feeding for the second print job subsequent to the sheet feeding for the first print job.

In S609, in a case where the number of remaining sheets to be printed for the first print job is determined to be greater than the threshold T (YES in S609), the process proceeds to S610, and the control unit 302 sets the determination value indicating whether or not the continuous printing can be made to "continuous printing=TRUE." After completing S610, the process returns to the flowchart of FIG. 5.

On the other hand, in a case where the number of remaining sheets to be printed for the first print job is equal to or less than the threshold T, the number of remaining sheets to be printed for the first print job is already fed to the conveyance path. In this case, the printer engine 127 determines that the sheet feeding for the first print job is completed, and the paper feed mechanism is in a state of a halt. Even if an additional sheet feeding instruction is given at this timing, the halt of the paper feed mechanism causes an interval between the preceding sheet and the subsequent sheet. As a result, even if image processing by the image processing unit 303 is on time, a sheet is not conveyed to the printer engine and printing is not executed. Accordingly, capping processing will be made for an ink ejection part of the printer engine. Then, processing to open the cap for executing printing associated with the second print job will be made again. Such delay in the timing of sheet feeding may cause downtime. In other words, in a case where the number of remaining sheets to be printed for the first print job is equal to or less than the threshold T, continuous printing, where printing for the first print job and the second print job is made in succession, cannot be achieved.

In S609, in a case where the number of remaining sheets to be printed for the first print job is determined to be equal to or less than the threshold T (NO in S609), the process proceeds to S611, and the control unit 302 sets the determination value indicating whether or not the continuous printing can be made to "continuous printing=FALSE." As such, the number of remaining sheets to be printed for the first print job is information indicating the progress of printing, and the control unit 302 according to the present embodiment sets the determination value indicating whether or not the continuous printing can be made based on such progress of the printing. After completing S611, the process returns to the flowchart of FIG. 5.

Then, returning to the flowchart of FIG. 5, the control unit 302 determines in S507 whether the determination value acquired in S506 is "TRUE." In a case where the determination value=TRUE (YES in S507), the control unit 302 instructs the printer engine 127, in S508, to feed sheets for the second print job. Furthermore, the control unit 302 instructs the information processing apparatus 200 to transmit print data for the second print job. As described above, the printer engine 127 executes sheet feeding for the second print job subsequent to the sheet feeding for the first print job. As such, the sheet feeding for the second print job is made subsequent to the sheet feeding for the first print job (that is, the continuous printing is achieved). It should be noted that the sheet feeding instruction in S508 may be given at the timing until the printer engine 127 completes the sheet feeding for the first print job.

In S509, the printer engine 127 prints out for the second print job subsequent to the printing for the first print job. In S510, once all pages for the first print job and the second print job are outputted onto the output tray 110, the processing of this flowchart ends.

Meanwhile, in a case where the determination value=FALSE (NO in S507), the printing for the first print job ends in S511, and the printer engine 127 temporarily stops in S512. In S513, the printer engine 127 starts printing for the second print job. In S514, after all pages for the second print job are outputted onto the output tray 110, the processing of this flowchart ends. It should be noted that, in a case of determining NO in S507, the control unit 302 may notify the information processing apparatus 200 that the continuous printing cannot be made for the second print job.

The determination whether the continuous printing can be made is executed for every processing of a print job in the present embodiment, but such determination may be made for every processing of a page. This is because that there may be a case where the printing setting of the number of colors for the printing, for example, differs by a page unit in spite of the same printing job. In this case, by making determination for every processing of a page, the determination whether the continuous printing can be made will be achieved more accurately.

As described above, the image forming apparatus 100 of the present embodiment achieves highly accurate determination regarding whether the continuous printing can be made by considering the number of remaining sheets to be printed associated with the print job. In addition, the determination regarding whether the continuous printing can be made is achieved more accurately by considering the number of copies to be printed associated with the print job. Consequently, in comparison of the present invention with image forming apparatuses of prior art, a highly reliable image forming apparatus can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, more accurate determination regarding whether or not the continuous printing can be made is achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-106899, filed on May 30, 2016, which is hereby incorporated by reference wherein in its entirety.

What is claimed is:

1. An image forming apparatus which performs printing based on a print job, the image forming apparatus comprising:
   a memory containing instructions; and
   at least one processor executing the instructions to:
   determine whether printing for a first print job and a second print job having been received after the first print job can be made continuously,
   in a case where it is determined that the printing for the first print job and the second print job can be made continuously, feed print media to be used for printing for the second print job to a conveyance path before completing outputting a printout for the first print job, and in a case where a number of copies to be printed for the first print job and a number of copies to be printed for the second print job are both greater than or equal to a predetermined number of copies, or in a case where the number of copies to be printed for the first print job and the number of copies to be printed for the second print job are both less than the predetermined number of copies, determine that the printing for the first print job and the second print job can be made continuously.

2. The image forming apparatus according to claim 1, wherein the instructions are further executed to, in a case where the number of remaining sheets to be printed for the first print job is greater than a threshold value, determine that the printing for the first print job and the second print job can be made continuously.

3. The image forming apparatus according to claim 2, wherein the threshold value is, out of the number of remaining sheets to be printed for the first print job, equal to the number of print media already fed.

4. The image forming apparatus according to claim 1, wherein the instructions are further executed to, in a case where a printing setting acquired from the first print job and a printing setting acquired from the second print job are the same, determine that the printing for the first print job and the second print job can be made continuously.

5. The image forming apparatus according to claim 4, wherein the printing setting includes at least any one of a size of print media, a type of print media, a printing side of print media, printing resolution, and the number of printing colors.

6. The image forming apparatus according to claim 1, wherein the instructions are further executed to instruct feeding of print media to the feed unit, wherein,
in a case where it is determined that the printing for the first print job and the second print job can be made continuously, instructions are executed to feed print media to be used for printing for the second print job before completing feeding of print media used for printing for the first print job.

7. An image forming method for performing printing based on a print job, the method comprising the steps of:
determining whether printing for a first print job and a second print job having been received after the first print job can be made continuously,
in a case where it is determined that the printing for the first print job and the second print job can be made continuously, feeding print media to be used for printing for the second print job to a conveyance path before completing outputting a printout for the first print job, and
in a case where a number of copies to be printed for the first print job and a number of copies to be printed for the second print job are both greater than or equal to a predetermined number of copies, or in a case where the number of copies to be printed for the first print job and the number of copies to be printed for the second print job are both less than the predetermined number of copies, determining that the printing for the first print job and the second print job can be made continuously.

8. The image forming method according to claim 7, wherein, in a case where the number of remaining sheets to be printed for the first print job is greater than a threshold value, it is determined that the printing for the first print job and the second print job can be made continuously.

9. The image forming method according to claim 8, wherein the threshold value is, out of the number of remaining sheets to be printed for the first print job, equal to the number of print media already fed in the feeding step.

10. The image forming method according to claim 7, wherein, in a case where a printing setting acquired from the first print job and a printing setting acquired from the second print job are the same, it is determined that the printing for the first print job and the second print job can be made continuously.

11. The image forming method according to claim 10, wherein the printing setting includes at least any one of a size of print media, a type of print media, a printing side of print media, printing resolution, and the number of printing colors.

12. The image forming method according to claim 7, wherein, in a case where it is determined that the printing for the first print job and the second print job can be made continuously, print media to be used for printing for the second print job is instructed to be fed before completing feeding of print media used for printing for the first print job.

13. The image forming apparatus according to claim 1, wherein, in a case where it is determined that the printing for the first print job and the second print job can be made continuously, print media to be used for printing for the second print job is fed to a conveyance path before completing outputting of all printouts for the first print job.

14. The image forming apparatus according to claim 1, wherein, in a case where the number of copies to be printed for a print job is less than the predetermined number of copies, the print media are conveyed at a first conveyance speed, and
in a case where the number of copies to be printed for a print job is greater than or equal to the predetermined number of copies, the print media are conveyed at a second conveyance speed which is faster than the first conveyance speed.

15. The image forming method according to claim 7, wherein, in a case where it is determined that the printing for the first print job and the second print job can be made continuously, print media to be used for printing for the second print job is fed to a conveyance path before completing outputting of all printouts for the first print job.

16. The image forming method according to claim 7, wherein, in a case where the number of copies to be printed for a print job is less than the predetermined number of copies, the print media are conveyed at a first conveyance speed, and
in a case where the number of copies to be printed for a print job is greater than or equal to the predetermined number of copies, the print media are conveyed at a second conveyance speed which is faster than the first conveyance speed.

* * * * *